US011263349B2

(12) United States Patent
Cuka et al.

(10) Patent No.: US 11,263,349 B2
(45) Date of Patent: Mar. 1, 2022

(54) SYSTEM FOR DISCOVERY AND ANALYSIS OF SOFTWARE DISTRIBUTED ACROSS AN ELECTRONIC NETWORK PLATFORM

(71) Applicant: Bank of America Corporation, Charlotte, NC (US)

(72) Inventors: David Aloysius Cuka, West Chicago, IL (US); Kathleen D. Schaumburg, Charlotte, NC (US); Karthikeyan Bala Subrahmanyam, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 304 days.

(21) Appl. No.: 16/724,661

(22) Filed: Dec. 23, 2019

(65) Prior Publication Data
US 2021/0192065 A1    Jun. 24, 2021

(51) Int. Cl.
| G06F 9/44 | (2018.01) |
| G06F 21/62 | (2013.01) |
| G06F 11/30 | (2006.01) |
| G06F 8/75 | (2018.01) |

(52) U.S. Cl.
CPC ............ *G06F 21/629* (2013.01); *G06F 8/751* (2013.01); *G06F 11/3006* (2013.01)

(58) Field of Classification Search
None
See application file for complete search history.

(56) References Cited

U.S. PATENT DOCUMENTS

| 8,627,178 | B2 | 1/2014 | Clifone et al. |
| 9,086,964 | B2 | 7/2015 | Grube et al. |
| 9,116,626 | B2 | 8/2015 | Gladwin et al. |
| 9,208,331 | B2 | 12/2015 | Grube et al. |
| 9,311,076 | B2 | 4/2016 | Grillo et al. |
| 9,749,419 | B2 | 8/2017 | Baptist et al. |
| 9,830,450 | B2 | 11/2017 | Jou et al. |
| 9,942,615 | B1 * | 4/2018 | Panchaksharaiah .. G06F 16/738 |
| 9,952,961 | B2 | 4/2018 | Atyam et al. |
| 10,013,471 | B2 | 7/2018 | Baptist et al. |
| 10,127,125 | B2 | 11/2018 | Krishnan et al. |
| 10,127,402 | B2 | 11/2018 | Resch |
| 10,157,199 | B2 | 12/2018 | Patiejunas et al. |
| 10,169,200 | B2 | 1/2019 | Ekambaram et al. |
| 10,241,759 | B2 | 3/2019 | Sass et al. |
| 10,354,210 | B2 | 7/2019 | Kour et al. |
| 10,360,180 | B2 | 7/2019 | Vas et al. |
| 10,445,179 | B2 | 10/2019 | Resch |

(Continued)

*Primary Examiner* — Qamrun Nahar
(74) *Attorney, Agent, or Firm* — Moore & Van Allen PLLC; Anup Shrinivasan Iyer

(57) ABSTRACT

Systems, computer program products, and methods are described herein for discovery and analysis of software distributed across an electronic network platform of an entity. The present invention is configured to continuously monitor one or more hardware devices associated with a technology environment; initiate an open source code discovery engine on the one or more hardware devices, wherein initiating further comprises automatically populating a first database with at least the portion of the one or more applications that match the attributes associated with open source code identifiers; and initiate an approval and enforcement engine on at least the portion of the one or more applications stored on the first database.

20 Claims, 2 Drawing Sheets

(56) References Cited

U.S. PATENT DOCUMENTS

| | | |
|---|---|---|
| 10,467,121 B2 | 11/2019 | Natari |
| 10,474,556 B2 | 11/2019 | Ranjan et al. |
| 10,503,496 B2 | 12/2019 | Natari |
| 2007/0198609 A1* | 8/2007 | Black .................... G06Q 10/087 |
| 2017/0295226 A1* | 10/2017 | Basta .................... H04L 65/403 |
| 2017/0374155 A1* | 12/2017 | Chen ......................... G06F 8/36 |
| 2021/0019359 A1* | 1/2021 | Newton ................ G06F 16/955 |

* cited by examiner

SYSTEM FOR DISCOVERY AND ANALYSIS OF SOFTWARE DISTRIBUTED ACROSS AN ELECTRONIC NETWORK PLATFORM

FIELD OF THE INVENTION

The present invention embraces a system for discovery and analysis of software distributed across an electronic network platform of an entity.

BACKGROUND

The acceptance and adoption of free and open source software (FOSS) is widespread and expanding rapidly across many industries. The use of FOSS can be an attractive resource for an entity across many departments including development, IT operations, and IT strategy. For an entity to successfully deploy or develop FOSS, a system of proper IT governance and management is critical.

There is a need for a system for discovery and analysis of software distributed across an electronic network platform of an entity.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for discovery and analysis of software distributed across an electronic network platform of an entity is presented. The system comprising: at least one non-transitory storage device; and at least one processing device coupled to the at least one non-transitory storage device, wherein the at least one processing device is configured to: continuously monitor, via a distributed network, one or more hardware devices associated with a technology environment; initiate an open source code discovery engine on the one or more hardware devices, wherein initiating further comprises: receiving, via the distributed network, information associated with one or more applications stored on each of the one or more hardware devices; comparing the information associated with the one or more applications with one or more attributes associated with open source code identifiers to determine a match; determining that information associated with at least a portion of the one or more applications matches the one or more attributes associated with the open source code identifiers; and automatically populating a first database with at least the portion of the one or more applications; and initiate an approval and enforcement engine on at least the portion of the one or more applications stored on the first database, wherein initiating further comprises determining whether at least the portion of the one or more applications are eligible for being accessed using the one or more hardware devices based on at least one or more user profiles and one or more open source code rules.

In some embodiments, the at least one processing device is further configured to determine the one or more user profiles associated with each of the one or more hardware devices, wherein the one or more user profiles comprises an authentication level.

In some embodiments, the authentication level associated with the one or more user profiles defines at least a number of applications and/or a type of application capable of being accessed by the one or more user profiles, wherein the type of application comprises at least a proprietary code and/or open source code.

In some embodiments, the at least one processing device is further configured to: determine that a first application is associated with at least the portion of the one or more applications stored on the first database, wherein the first application is associated with a first hardware device; determine that the first hardware device is associated with a first user profile, wherein the first user profile is associated with the one or more user profiles; determine that the first user profile is associated with a first authentication level; and determine, using the approval and enforcement engine, that the first user profile is eligible to access the first application using the first hardware device.

In some embodiments, the at least one processing device is further configured to: determine that the first user profile is associated with a second authentication level; and determine, using the approval and enforcement engine, that the first user profile is not eligible to access the first application using the first hardware device.

In some embodiments, the at least one processing device is further configured to: transmit control signals configured to cause the first hardware device to restrict the first user profile from accessing the first application based on at least determining that the first user profile is not eligible to access the first application using the first hardware device.

In some embodiments, the at least one processing device is further configured to: initiate a remote uninstallation subroutine on the first hardware device based on at least determining that the first user profile is not eligible to access the first application using the first hardware device, wherein initiating further comprises removing the first application from the first hardware device.

In some embodiments, the at least one processing device is further configured to: determine that at least the portion of the one or more applications are not eligible for being accessed using the one or more hardware devices based on at least the one or more user profiles and the one or more open source code rules; and automatically initiate the remote uninstallation subroutine on the one or more hardware devices based on at least determining that at least the portion of the one or more applications are not eligible for being accessed using the one or more hardware devices, wherein initiating further comprises removing at least the portion of the one or more applications from the one or more hardware devices.

In some embodiments, the at least one processing device is further configured to: determine that the first hardware device is associated with a second user profile, wherein the second user profile is associated with the one or more user profiles; determine that the second user profile is associated with the first authentication level; determine, using the approval and enforcement engine, that the second user profile is eligible to access the first application using the first hardware device while the first user profile is not eligible to access the first application using the first hardware device; and transmit control signals configured to cause the first hardware device to allow the second user profile to access the first application using the first hardware device while restricting the first user profile to access the first application using the using the first hardware device.

In some embodiments, the at least one processing device is further configured to: receive, via the first hardware device, an indication from the first user profile to access the first application, wherein the first user profile is restricted from accessing the first application using the first hardware device, wherein the first user profile is associated with the second authentication level; transmit, via the first hardware device, a request to the first user profile to provide one or more authentication credentials; receive, via the first hardware device, the one or more authentication credentials from the first user profile; determine that the one or more authentication credentials provided by the first user profile elevates the first user profile from the second authentication level to the first authentication level; and remove restrictions on the first user profile to access the first application using the first hardware device, thereby enabling the first user profile to access the first application using the first hardware device.

In some embodiments, the at least one processing device is further configured to: receive, from the approval and enforcement engine, information associated with one or more applications that are not eligible for being accessed using the one or more hardware devices based on at least the one or more user profiles and the one or more open source code rules; and initiate an execution of a dashboard report script, wherein the dashboard report script is configured to generate a graphical interface for display on a user device, wherein the graphical interface comprises the information associated with one or more applications that are not eligible for being accessed using the one or more hardware devices.

In some embodiments, the at least one processing device is further configured to: determine that at least the portion of the one or more applications are not eligible for being accessed using the one or more hardware devices based on at least the one or more user profiles and the one or more open source code rules; and transmit a notification to the one or more user profiles currently having access to at least the portion of the one or more applications, wherein the notification comprises a tracking ticket and a target time limit, wherein the tracking ticket is configured to track one or more actions performed on at least the portion of the one or more applications by the one or more user profiles, wherein the target time limit comprises a predetermined time limit within which the one or more user profiles are required to remove at least the portion of the one or more applications from the one or more hardware devices.

In another aspect, a computer implemented method discovery and analysis of software distributed across an electronic network platform of an entity is presented. The method comprising: continuously monitoring, using a computing device processor, via a distributed network, one or more hardware devices associated with a technology environment; initiating, using a computing device processor, an open source code discovery engine on the one or more hardware devices, wherein initiating further comprises: receiving, via the distributed network, information associated with one or more applications stored on each of the one or more hardware devices; compare the information associated with the one or more applications with one or more attributes associated with open source code identifiers to determine a match; determining that information associated with at least a portion of the one or more applications matches the one or more attributes associated with the open source code identifiers; and automatically populating a first database with at least the portion of the one or more applications; and initiating, using a computing device processor, an approval and enforcement engine on at least the portion of the one or more applications stored on the first database, wherein initiating further comprises determining whether at least the portion of the one or more applications are eligible for being accessed using the one or more hardware devices based on at least one or more user profiles and one or more open source code rules.

In yet another aspect, a computer program product for discovery and analysis of software distributed across an electronic network platform of an entity is presented. The computer program product comprising a non-transitory computer-readable medium comprising code causing a first apparatus to: continuously monitor, via a distributed network, one or more hardware devices associated with a technology environment; initiate an open source code discovery engine on the one or more hardware devices, wherein initiating further comprises: receiving, via the distributed network, information associated with one or more applications stored on each of the one or more hardware devices; comparing the information associated with the one or more applications with one or more attributes associated with open source code identifiers to determine a match; determining that information associated with at least a portion of the one or more applications matches the one or more attributes associated with the open source code identifiers; and automatically populating a first database with at least the portion of the one or more applications; and initiate an approval and enforcement engine on at least the portion of the one or more applications stored on the first database, wherein initiating further comprises determining whether at least the portion of the one or more applications are eligible for being accessed using the one or more hardware devices based on at least one or more user profiles and one or more open source code rules.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
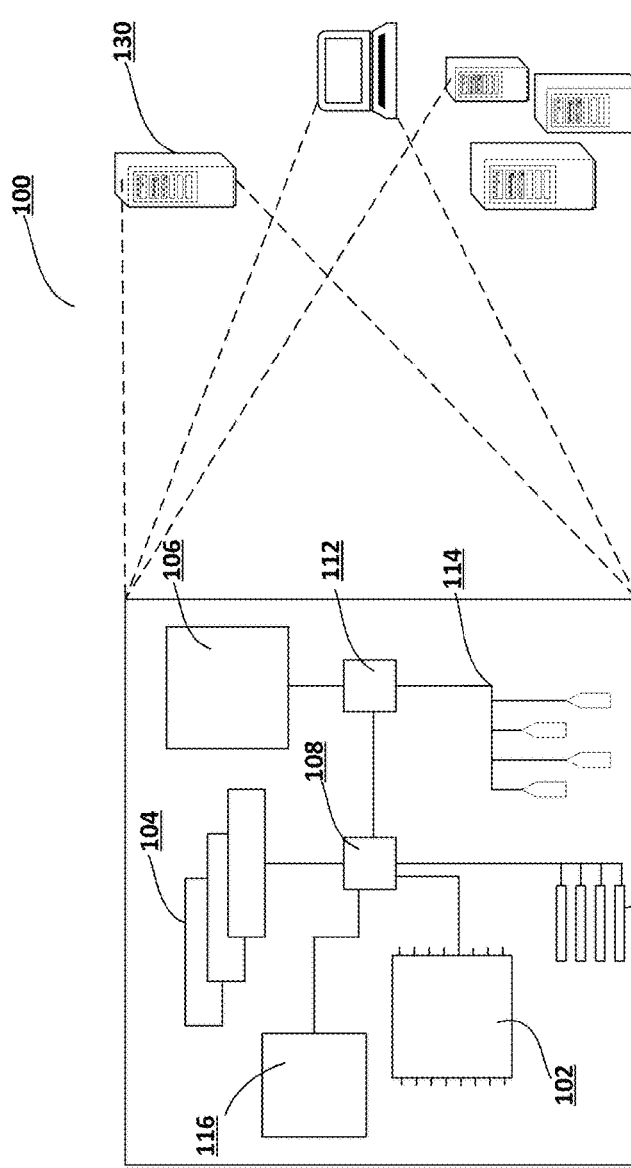
Figure 1:
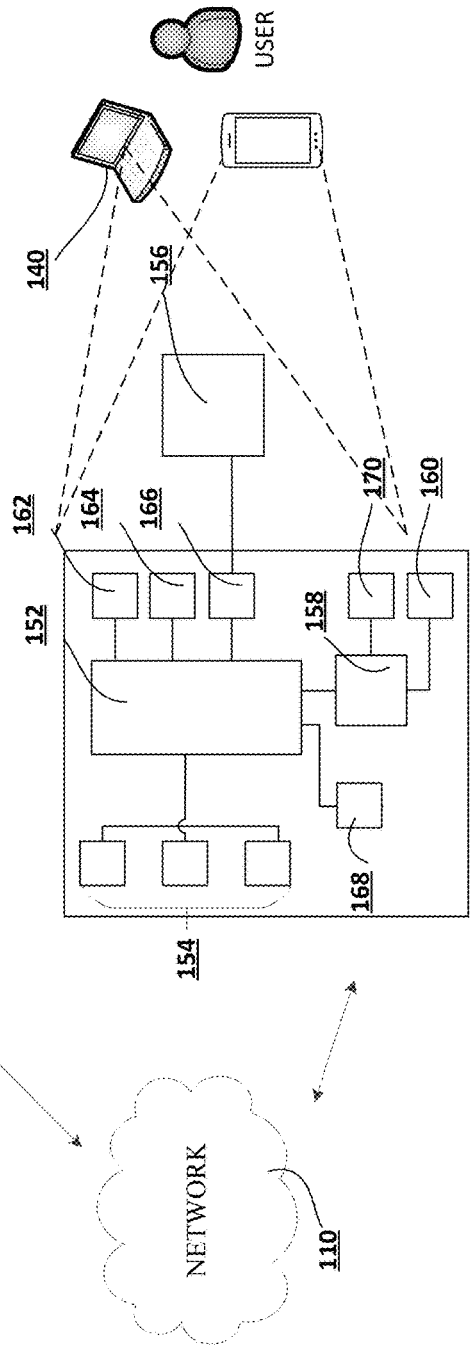
Figure 2:
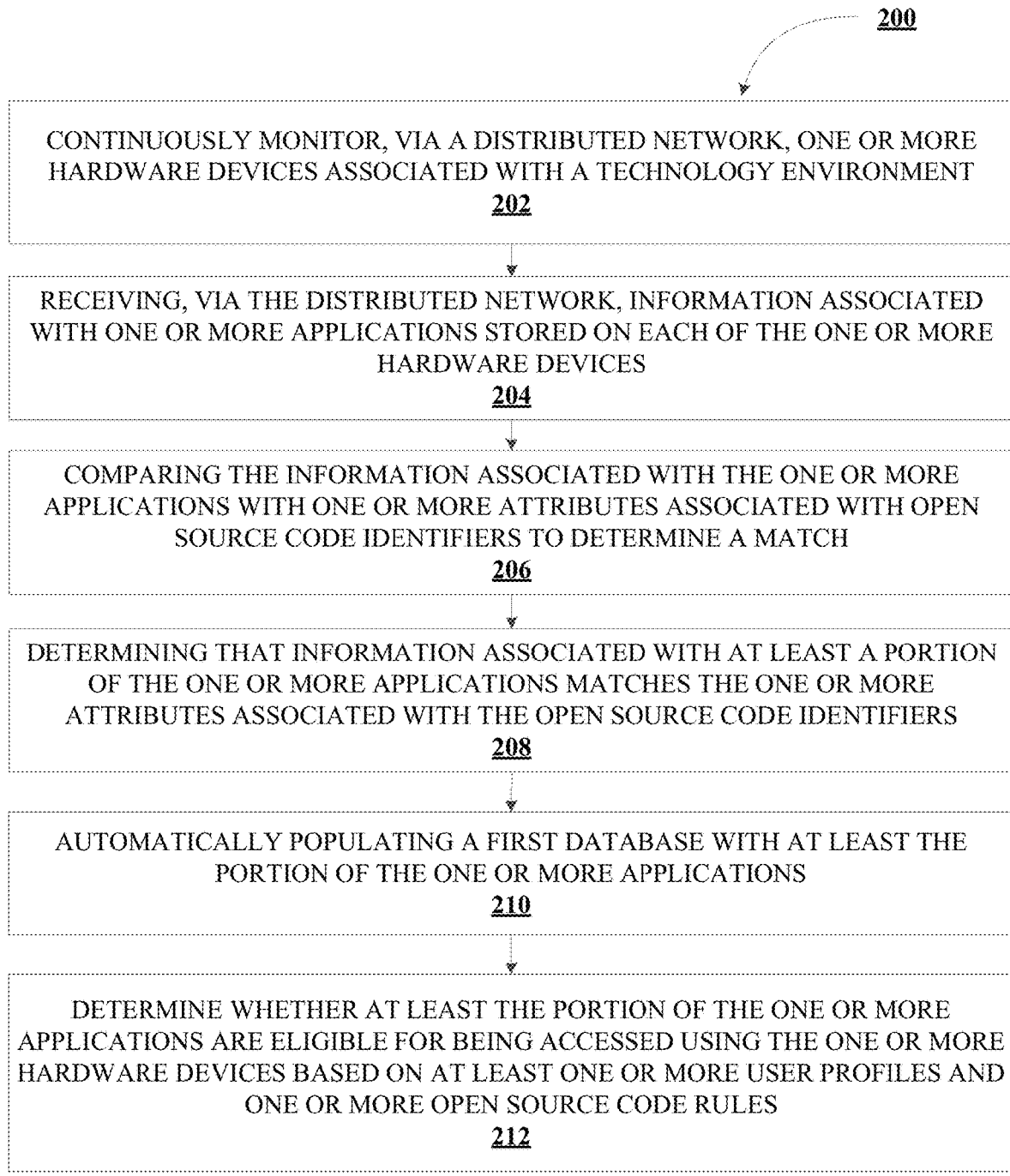

Having thus described embodiments of the invention in general terms, reference will now be made the accompanying drawings, wherein:

FIG. 1 illustrates technical components of a system for discovery and analysis of software distributed across an electronic network platform of an entity, in accordance with an embodiment of the invention; and FIG. 2 illustrates a process flow for a system for discovery and analysis of software distributed across an electronic network platform of an entity, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As used herein, a "user" may be an individual associated with an entity. In some embodiments, a "user" may be an employee (e.g., a developer, a coder, an architect, an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer.

As used herein, a "user interface" is any device or software that allows a user to input information, such as commands or data, into a device, or that allows the device to output information to the user. For example, the user interface may include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, "authentication credentials" is any information that can be used to identify of a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

As used herein, to "monitor" is to watch, observe, or check something for a special purpose over a period of time. The "monitoring" may occur periodically over the period of time, or the monitoring may occur continuously over the period of time. In some embodiments, a system may actively monitor a database, wherein the system reaches out to the database and watches, observes, or checks the database for changes, updates, and the like. In other embodiments, a system may passively monitor a database, wherein the database provides information to the system and the system then watches, observes, or checks the provided information.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

FIG. 1 presents an exemplary block diagram of the system environment for discovery and analysis of software distributed across an electronic network platform of an entity 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute one or more applications stored thereon. In some embodiments, a user of the user input system 140 may access one or more applications stored on the one or more hardware devices, such as the system 130 and one or more other devices (not shown in the figure) connected to the network 110. Accordingly, the one or more applications may be configured to communicate with the system 130 and other hardware devices in the system environment 100, perform a transaction, input information onto a user interface presented on the user input system 140, or the like. The applications stored on the user input system 140 and the system 130 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the system 130 and the user input system 140 may be used to implement the processes described herein, including the mobile-side and server-side processes for installing a computer program from a mobile device to a computer, in accordance with an embodiment of the present invention. The system 130 is intended to represent various forms of digital computers, such as laptops, desktops, workstations, personal digital assistants, servers, blade servers, mainframes, and other appropriate computers.

The user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application, and allows memory reuse for better utilization of the memory resources when the data sizes are large.

The high-speed interface 1408 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140, or may also store applications or other information therein. In some embodiments, expansion memory may include instructions to carry out or supplement the processes described above, and may include secure information also. For example, expansion memory may be provided as a security module for user input system 140, and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein. It will be understood that the one or more applications stored in the system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1 is exemplary and that other embodiments may vary. In some embodiments, the system environment 100 may include additional devices similar to the user input system 140 and/or other hardware devices with specific-functions. As an example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

IT governance can be defined as a set of processes to effectively manage all IT resources, functions, and processes which support the overall IT strategy of the entity. An enforceable program of IT governance is key to gaining more value from open source and protecting the overall interests of the entity. With the level of customizability, freedom, and flexibility provided by free open source software (FOSS), entities are increasingly adopting FOSS to be integrated with proprietary and third party source code to create a robust technology environment. Understanding and targeting open source issues within the technology environment of the entity is the first of many steps in developing and implementing a FOSS governance system.

The goal with the FOSS governance process is to ensure that any software (proprietary, third party, or FOSS) that is being used within the technology environment has been audited, reviewed and approved and that the entity has a plan to fulfill the license obligations resulting from using the various software components integrated in the environment. This type of governance and compliance due diligence is often tracked and executed by scanning the source code of each application individually within the technology environment, determining whether each scanned application complies with a set of open source code rules, and approving/disapproving the use of the application based on determining whether the scanned application complies with the set of open source code rules. However, large entities with expansive technology platform require a more efficient and seamless FOSS governance system that not only determines whether a FOSS is approved/disapproved, but also has the ability to initiate the execution of an action based on the decision-making process. The present invention not only provides a scalable option of scanning for FOSS across the entire technology platform of the entity, but also provides an automated solution for enforcing FOSS governance on devices across the technology platform.

FIG. 2 illustrates a process flow for a system for discovery and analysis of software distributed across an electronic network platform of an entity 200, in accordance with an embodiment of the invention. As shown in block 202, the process flow includes continuously monitoring, via a distributed network, one or more hardware devices associated with a technology environment. In some embodiments, the one or more hardware devices may include, but is not limited to one or more communication devices, networking hardware such as gateways, routers, network bridges, modems, wireless access points, networking cables, line drivers, switches, hubs, and/or reapeaters, processing devices or equipment that are connected to the one or more communication devices, and/or the like. In some embodiments, monitoring the hardware devices may include at least continuously monitoring the software applications stored on the hardware devices. For purposes of this invention, the term "application" may refer to any software application that is stored on the hardware devices, including, but not limited to system software and/or application software. Accordingly, an application may refer to operating systems, device drivers, middleware, utility software, shell and windowing systems, general purpose application packages, customer software, and/or the like. In some embodiments, continuously monitoring the hardware devices may include initiating a monitoring tool to monitor the hardware devices based on a scheduled full-platform scan, monitor the hardware devices based on a periodic schedule, monitor the hardware devices in response to software application changes on a previously approved hardware device, monitor the hardware devices in response to an incoming request from a user to install or uninstall a software application component on the hardware device, and/or continuously running the hardware device monitoring tool in the background to identify any changes to the hardware device, and/or the like.

Next, as shown in block 204, the process flow includes receiving, via the distributed network, information associated with one or more applications stored on each of the one or more hardware devices. In some embodiments, the system may be configured to receive information associated with the one or more applications using an open source code discovery engine on the one or more hardware devices. The open source code discovery engine may be configured to initiate a source code scan on each application stored on the hardware devices to identify the underlying sets of instructions, declarations, functions, loops, and other statements, which act as instructions for the application on how to operate. By scanning the source code, the system may be configured to receive information such as bill of materials, origins of the source code, licenses in effect, indications of any licensing conflicts, file inventory, identified files, dependencies, code matches, files pending identification, source code matches pending identification, and/or the like.

Next, as shown in block 206, the process flow includes comparing the information associated with the one or more applications with one or more attributes associated with open source code identifiers to determine a match. In some embodiments, the one or more attributes associated with open source code identifiers are used to indicate whether the source code associated with the applications stored on the hardware device are FOSS code, proprietary software code, or third party source code, or any information thereof.

Next, as shown in block 208, the process flow includes determining that information associated with at least a portion of the one or more applications matches the one or more attributes associated with the open source code identifiers. In some embodiments, determining that the information associated with at least a portion of the one or more applications matches the one or more attributes associated with the open source code identifiers may be an indication that the application is associated with a FOSS code, either as a stand-alone FOSS application, or as a FOSS code embedded within proprietary software and/or third party code.

Next, as shown in block 210, the process flow includes automatically populating a first database with at least the portion of the one or more applications. In this way, any application associated with a FOSS code, either as a stand-alone FOSS application, or as a FOSS code embedded within proprietary software and/or third party code are stored in the first database.

Next, as shown in block 212, the process flow includes determining whether at least the portion of the one or more applications stored on the first database are eligible for being accessed using the one or more hardware devices based on at least one or more user profiles and one or more open source code rules. In this regard, the system may be configured to initiate an approval and enforcement engine on at least the portion of the one or more applications stored on the first database.

In some embodiments, the system may be configured to determine the one or more user profiles associated with each of the one or more hardware devices. For purposes of the invention, each user with access to the hardware devices may be associated with a user profile. In some embodiments, the user profile may refer to a record of user-specific data that define the user's technology environment. The record may include display settings, application settings, and network connections. This includes what the user sees on his or her computing device screen, what files, applications and directories they have access to, and/or the like. In one aspect, the user associated with a user profile may have access to, installs, and/or uses applications currently stored on the hardware devices, but may not have the authorization to install and/or use some of the applications, specifically applications stored on the first database.

In some embodiments, each user profile is associated with an authentication level. In one aspect, the authentication level may define at least a number of applications and/or a type of application capable of being accessed by the user profile. As described herein, the type of application may include FOSS, proprietary software, and/or third party software. In some embodiments, the authentication level may define whether the user has the permission to access a particular application. In some other embodiments, the authentication level may define whether the user has the permission to access one or more specific features of the particular application. For example, in an application which integrates FOSS, proprietary source code, and/or third party source code, the authentication level may define whether the user has permission to access features of the application specific to the FOSS code, the proprietary source code and/or third party source code.

In some embodiments, the system may be configured to determine that a first application is associated with at least the portion of the one or more applications stored on the first database, i.e., applications associated with FOSS code, wherein the first application is associated with a first hardware device. Next, the system may be configured to determine that the first hardware device is associated with a first user profile, and the first user profile is associated with a first authentication level. In one aspect, the first authentication level may allow the first user profile to be eligible to access the at least the portion of the one or more applications stored on the first database. In response, the system may be configured to determine, using the approval and enforcement engine, that the first user profile is eligible to access the first application using the first hardware device.

In some other embodiments, the system may be configured to determine that the first user profile is associated with a second authentication level. In one aspect, the second authentication level may not be adequate to allow the first user profile to access the at least the portion of the one or more applications stored on the first database. In response, the system may be configured to determine, using the approval and enforcement engine, that the first user profile is not eligible to access the first application using the first hardware device. In response, the system may be configured to transmit control signals configured to cause the first hardware device to restrict the first user profile from accessing the first application based on at least determining that the first user profile is not eligible to access the first application using the first hardware device. In one aspect, the system may be configured to initiate a remote uninstallation subroutine on the first hardware device based on at least determining that the first user profile is not eligible to access the first application using the first hardware device, wherein initiating further comprises removing the first application from the first hardware device.

In some embodiments, the system may be configured to determine that the first hardware device is associated with a second user profile. Next, the system may be configured to determine that the second user profile is associated with the first authentication level. In response, the system may be configured to determine, using the approval and enforcement engine, that the second user profile is eligible to access the first application using the first hardware device while the first user profile is not eligible to access the first application using the first hardware device. In response, the system may be configured to transmit control signals configured to cause the first hardware device to allow the second user profile to access the first application using the first hardware device while restricting the first user profile to access the first application using the using the first hardware device.

In some embodiments, the system may be configured to receive, via the first hardware device, an indication from the first user profile to access the first application, wherein the first user profile is restricted from accessing the first application using the first hardware device, wherein the first user profile is associated with the second authentication level. In response, the system may be configured to transmit, via the first hardware device, a request to the first user profile to provide one or more authentication credentials. Next, the system may be configured to receive, via the first hardware device, a the one or more authentication credentials from the first user profile. Having received the one or more authentication credentials, the system may be configured to determine that the one or more authentication credentials provided by the first user profile elevates the first user profile from the second authentication level to the first authentication level. In response, the system may be configured to remove restrictions on the first user profile to access the first application using the first hardware device, thereby enabling the first user profile to access the first application using the first hardware device.

In some embodiments, the system may be configured to determine whether at least the portion of the one or more applications stored in the first database are eligible for being accessed using the one or more hardware devices based on at least one or more open source code rules. In one aspect, the one or more open source code rules includes incoming and outgoing licenses associated with the one or more applications stored on hardware devices distributed across the technology environment, a level of interaction between FOSS and a proprietary software on a static and dynamic link level, approval information associated with the applications, approval information associated with applications that are similar or related to the applications stored on the hardware devices, analyzing the application to determine whether any exposure issues with the underlying source code has been documented and understood, determining whether the FOSS code is designed for a specific use case, and if so, whether the incoming and/or outgoing licensing terms reflect this purpose, one or more source code metrics such as maintainability index indicating a maintainability of the code, cyclomatic complexity indicating a structural complexity of the code, depth of inheritance indicating a number of different classes that inherit from one another, class coupling measuring the coupling to unique classes through parameters, local variables, return types, method calls, generic or template instantiations, base classes, interface implementations, fields defined on external types, attribute declarations, or the like, lines of code indicating the approximate number of lines in the code, relational cohesion, instability and abstractness, and/or the like.

In some embodiments, when determining whether at least the portion of the one or more applications stored on the first database is eligible for being accessed by the one or more hardware devices, the system may be configured to identify whether a subset of FOSS code that meets or satisfies the one or more open source code rules. For example, if the information associated with the FOSS code indicates an existence of an incoming or outgoing license that matches the license information specified in the open source code rules, the conditions specified by the open source code rules are considered to be met or satisfied. In another example, if the maintainability index of the FOSS code is equal to or below the predetermined threshold maintainability index of the open source code rules, the conditions specified by the open source code rules are considered to be met or satisfied.

In some embodiments, the system may be configured to receive, from the approval enforcement engine, information associated with one or more applications that are not eligible for being accessed using the one or more hardware devices based on at least the one or more user profiles and the one or more open source code rules. In response, the system may be configured to initiate an execution of a dashboard report script configured to generate a graphical interface for display on a user device, wherein the graphical interface comprises the information associated with one or more applications that are not eligible for being accessed using the one or more hardware devices. In some embodiments, the system may be configured to transmit a notification to the one or more user profiles currently having access to at least the portion of the one or more applications, wherein the notification comprises a tracking ticket and a target time limit. In one aspect, the tracking ticket is configured to track one or more actions performed on at least the portion of the one or more applications by the one or more user profiles, and the target time limit may include a predetermined time limit within which the one or more user profiles are required to remove at least the portion of the one or more applications from the one or more hardware devices.

If the one or more user profiles fail to remove at least the portion of the one or more applications from the hardware devices, the system may be configured to automatically initiate the remote uninstallation subroutine on the one or more hardware devices based on at least determining that at least the portion of the one or more applications are not eligible for being accessed using the one or more hardware devices, wherein initiating further comprises removing at least the portion of the one or more applications from the one or more hardware devices.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for discovery and analysis of software distributed across an electronic network platform of an entity, the system comprising:
    at least one non-transitory storage device; and
    at least one processing device coupled to the at least one non-transitory storage device, wherein the at least one processing device is configured to:
        continuously monitor, via a distributed network, one or more hardware devices associated with a technology environment;
        initiate an open source code discovery engine on the one or more hardware devices, wherein initiating further comprises:
            receiving, via the distributed network, information associated with one or more applications stored on each of the one or more hardware devices;
            comparing the information associated with the one or more applications with one or more attributes associated with open source code identifiers to determine a match;
            determining that information associated with at least a portion of the one or more applications matches the one or more attributes associated with the open source code identifiers; and
            automatically populating a first database with at least the portion of the one or more applications; and
        initiate an approval and enforcement engine on at least the portion of the one or more applications stored on the first database, wherein initiating further comprises determining whether at least the portion of the one or more applications are eligible for being accessed using the one or more hardware devices based on at least one or more user profiles and one or more open source code rules.

2. The system of claim 1, wherein the at least one processing device is further configured to determine the one or more user profiles associated with each of the one or more hardware devices, wherein the one or more user profiles comprises an authentication level.

3. The system of claim 2, wherein the authentication level associated with the one or more user profiles defines at least a number of applications and/or a type of application capable of being accessed by the one or more user profiles, wherein the type of application comprises at least a proprietary code and/or open source code.

4. The system of claim 3, wherein the at least one processing device is further configured to:
    determine that a first application is associated with at least the portion of the one or more applications stored on the first database, wherein the first application is associated with a first hardware device;
    determine that the first hardware device is associated with a first user profile, wherein the first user profile is associated with the one or more user profiles;
    determine that the first user profile is associated with a first authentication level; and
    determine, using the approval and enforcement engine, that the first user profile is eligible to access the first application using the first hardware device.

5. The system of claim 4, wherein the at least one processing device is further configured to:
    determine that the first user profile is associated with a second authentication level; and determine, using the approval and enforcement engine, that the first user profile is not eligible to access the first application using the first hardware device.

6. The system of claim 5, wherein the at least one processing device is further configured to:
transmit control signals configured to cause the first hardware device to restrict the first user profile from accessing the first application based on at least determining that the first user profile is not eligible to access the first application using the first hardware device.

7. The system of claim 6, wherein the at least one processing device is further configured to:
initiate a remote uninstallation subroutine on the first hardware device based on at least determining that the first user profile is not eligible to access the first application using the first hardware device, wherein initiating further comprises removing the first application from the first hardware device.

8. The system of claim 7, wherein the at least one processing device is further configured to:
determine that at least the portion of the one or more applications are not eligible for being accessed using the one or more hardware devices based on at least the one or more user profiles and the one or more open source code rules; and
automatically initiate the remote uninstallation subroutine on the one or more hardware devices based on at least determining that at least the portion of the one or more applications are not eligible for being accessed using the one or more hardware devices, wherein initiating further comprises removing at least the portion of the one or more applications from the one or more hardware devices.

9. The system of claim 6, wherein the at least one processing device is further configured to:
determine that the first hardware device is associated with a second user profile, wherein the second user profile is associated with the one or more user profiles;
determine that the second user profile is associated with the first authentication level;
determine, using the approval and enforcement engine, that the second user profile is eligible to access the first application using the first hardware device while the first user profile is not eligible to access the first application using the first hardware device; and
transmit control signals configured to cause the first hardware device to allow the second user profile to access the first application using the first hardware device while restricting the first user profile to access the first application using the using the first hardware device.

10. The system of claim 6, wherein the at least one processing device is further configured to:
receive, via the first hardware device, an indication from the first user profile to access the first application, wherein the first user profile is restricted from accessing the first application using the first hardware device, wherein the first user profile is associated with the second authentication level;
transmit, via the first hardware device, a request to the first user profile to provide one or more authentication credentials;
receive, via the first hardware device, the one or more authentication credentials from the first user profile;

determine that the one or more authentication credentials provided by the first user profile elevates the first user profile from the second authentication level to the first authentication level; and
remove restrictions on the first user profile to access the first application using the first hardware device, thereby enabling the first user profile to access the first application using the first hardware device.

11. The system of claim 1, wherein the at least one processing device is further configured to:
receive, from the approval and enforcement engine, information associated with one or more applications that are not eligible for being accessed using the one or more hardware devices based on at least the one or more user profiles and the one or more open source code rules; and
initiate an execution of a dashboard report script, wherein the dashboard report script is configured to generate a graphical interface for display on a user device, wherein the graphical interface comprises the information associated with one or more applications that are not eligible for being accessed using the one or more hardware devices.

12. The system of claim 1, wherein the at least one processing device is further configured to:
determine that at least the portion of the one or more applications are not eligible for being accessed using the one or more hardware devices based on at least the one or more user profiles and the one or more open source code rules; and
transmit a notification to the one or more user profiles currently having access to at least the portion of the one or more applications, wherein the notification comprises a tracking ticket and a target time limit, wherein the tracking ticket is configured to track one or more actions performed on at least the portion of the one or more applications by the one or more user profiles, wherein the target time limit comprises a predetermined time limit within which the one or more user profiles are required to remove at least the portion of the one or more applications from the one or more hardware devices.

13. A computer implemented method for discovery and analysis of software distributed across an electronic network platform of an entity, the method comprising:
continuously monitoring, using a computing device processor, via a distributed network, one or more hardware devices associated with a technology environment;
initiating, using a computing device processor, an open source code discovery engine on the one or more hardware devices, wherein initiating further comprises:
receiving, via the distributed network, information associated with one or more applications stored on each of the one or more hardware devices;
compare the information associated with the one or more applications with one or more attributes associated with open source code identifiers to determine a match;
determining that information associated with at least a portion of the one or more applications matches the one or more attributes associated with the open source code identifiers; and
automatically populating a first database with at least the portion of the one or more applications; and
initiating, using a computing device processor, an approval and enforcement engine on at least the portion of the one or more applications stored on the first database, wherein initiating further comprises determining whether at least the portion of the one or more applications are eligible for being accessed using the one or more hardware devices based on at least one or more user profiles and one or more open source code rules.

14. The method of claim 13, wherein the method further comprises:
    determining the one or more user profiles associated with each of the one or more hardware devices, wherein the one or more user profiles comprises an authentication level.

15. The method of claim 14, wherein the authentication level associated with the one or more user profiles defines at least a number of applications and/or a type of application capable of being accessed by the one or more user profiles, wherein the type of application comprises at least a proprietary code and/or open source code.

16. The method of claim 15, wherein the method further comprises:
    determining that a first application is associated with at least the portion of the one or more applications stored on the first database, wherein the first application is associated with a first hardware device;
    determining that the first hardware device is associated with a first user profile, wherein the first user profile is associated with the one or more user profiles;
    determining that the first user profile is associated with a first authentication level; and
    determining, using the approval and enforcement engine, that the first user profile is eligible to access the first application using the first hardware device.

17. The method of claim 16, wherein the method further comprises:
    determining that the first user profile is associated with a second authentication level; and
    determining, using the approval and enforcement engine, that the first user profile is not eligible to access the first application using the first hardware device.

18. The method of claim 17, wherein the method further comprises:
    transmitting control signals configured to cause the first hardware device to restrict the first user profile from accessing the first application based on at least determining that the first user profile is not eligible to access the first application using the first hardware device.

19. The method of claim 18, wherein the method further comprises:
    initiating a remote uninstallation subroutine on the first hardware device based on at least determining that the first user profile is not eligible to access the first application using the first hardware device, wherein initiating further comprises removing the first application from the first hardware device.

20. A computer program product for discovery and analysis of software distributed across an electronic network platform of an entity, the computer program product comprising a non-transitory computer-readable medium comprising code causing a first apparatus to:
    continuously monitor, via a distributed network, one or more hardware devices associated with a technology environment;
    initiate an open source code discovery engine on the one or more hardware devices, wherein initiating further comprises:
        receiving, via the distributed network, information associated with one or more applications stored on each of the one or more hardware devices;
        comparing the information associated with the one or more applications with one or more attributes associated with open source code identifiers to determine a match;
        determining that information associated with at least a portion of the one or more applications matches the one or more attributes associated with the open source code identifiers; and
        automatically populating a first database with at least the portion of the one or more applications; and
    initiate an approval and enforcement engine on at least the portion of the one or more applications stored on the first database, wherein initiating further comprises determining whether at least the portion of the one or more applications are eligible for being accessed using the one or more hardware devices based on at least one or more user profiles and one or more open source code rules.

* * * * *